United States Patent
Chen et al.

(10) Patent No.: US 10,666,418 B1
(45) Date of Patent: May 26, 2020

(54) SMART PHASE SWITCHING METHOD AND SMART PHASE SWITCHING SYSTEM FOR A TIMING RECOVERY PROCESS

(71) Applicant: Realtek Semiconductor Corp., HsinChu (TW)

(72) Inventors: Yan-Guei Chen, Pingtung County (TW); Ming-Chieh Cheng, Taipei (TW); Liang-Wei Huang, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/680,478

(22) Filed: Nov. 11, 2019

(30) Foreign Application Priority Data

Aug. 6, 2019 (TW) .............................. 108127906 A

(51) Int. Cl.
*H04L 7/00* (2006.01)
*H04L 27/227* (2006.01)
*H04L 27/00* (2006.01)

(52) U.S. Cl.
CPC ........ *H04L 7/0054* (2013.01); *H04L 27/2275* (2013.01); *H04L 2027/0036* (2013.01); *H04L 2027/0046* (2013.01)

(58) Field of Classification Search
CPC ............. H04L 27/2275; H04L 27/2338; H04L 7/0054; H04L 7/085; H04L 2027/0057; H04L 27/02
See application file for complete search history.

(56) References Cited

U.S. PATENT DOCUMENTS

| | | | |
|---|---|---|---|
| 5,121,086 A * | 6/1992 | Srivastava | H03L 7/148 331/11 |
| 5,610,949 A * | 3/1997 | Petranovich | H04L 7/0331 329/304 |
| 7,031,405 B1 * | 4/2006 | Touzni | H04L 27/0014 375/233 |
| 2004/0086067 A1 | 5/2004 | Wang | |
| 2005/0201491 A1 * | 9/2005 | Wei | H04L 7/0337 375/326 |
| 2006/0140321 A1 * | 6/2006 | Tell | H03L 7/0814 375/376 |
| 2006/0285366 A1 * | 12/2006 | Radecker | H02M 3/33507 363/16 |

(Continued)

*Primary Examiner* — Khanh C Tran
(74) *Attorney, Agent, or Firm* — Winston Hsu

(57) ABSTRACT

A smart phase switching method includes setting a first phase switching threshold, a convergence upper bound, and a convergence lower bound, sampling a received signal continuously for acquiring a phase offset accumulated value of the received signal during each period, updating the first phase switching threshold to generate a second phase switching upper bound threshold and a second phase switching lower bound threshold when a plurality of phase offset accumulated values of the received signal during a first predetermined time interval fall into a range from the convergence upper bound to the convergence lower bound, and sampling the received signal continuously for determining if a phase is switched to an opposite operating point according to a phase offset accumulated value of the received signal after the second phase switching upper bound threshold and the second phase switching lower bound threshold are generated.

20 Claims, 6 Drawing Sheets

(56) References Cited

U.S. PATENT DOCUMENTS

| | | | |
|---|---|---|---|
| 2015/0188551 A1* | 7/2015 | Aziz | H04L 7/0058 375/375 |
| 2015/0200765 A1* | 7/2015 | Bonaccio | H04L 7/0029 375/374 |

* cited by examiner

SMART PHASE SWITCHING METHOD AND SMART PHASE SWITCHING SYSTEM FOR A TIMING RECOVERY PROCESS

BACKGROUND OF THE INVENTION

1. Field of the Invention

The present invention illustrates a smart phase switching method and a smart phase switching system, and more particularly, a smart phase switching method and a smart phase switching system capable of reducing system working loads for improving performance of a timing recovery process.

2. Description of the Prior Art

With the rapid developments of technologies, wired or wireless communications systems have been adopted in our daily life. Due to variability of cable lengths, manufacturing processes, and wireless channel gains, signal timings of a transmitter and a receiver may be asynchronous. In a conventional timing recovery mechanism, the receiver can detect a phase difference (i.e., a phase error) by using a timing error detector or a phase detector. Then, the receiver can accumulate at least one phase difference and compensate the at least one phase difference by using a loop filter.

In a phase difference compensation mechanism, a phase switching frequency is an important performance indicator. When the transmitter switches a phase to an opposite operating point according to an accumulated phase difference, equivalent frequency responses (or say, "channel environment") may be changed. Therefore, when the phase is frequently switched, the system becomes unstable, resulting in a poor communications efficiency or malfunctions of some circuit components.

For example, in wired communications, when a length of the cable is changed, a distribution of channel frequency responses is changed accordingly. However, in communications standards, a decision rule of switching the phase is relevant to a predetermined constant. Since the conventional phase switching method of the timing recovery mechanism lacks of introducing variations of wired or wireless channels or signals, the system is hard to improve its performance. Further, since the phase is frequently switched, a risk of resulting in malfunctions of some circuit components may occur.

SUMMARY OF THE INVENTION

In an embodiment of the present invention, a smart phase switching method is disclosed. The smart phase switching method comprises setting a first phase switching threshold, a convergence upper bound, and a convergence lower bound, sampling a received signal continuously for acquiring a phase offset accumulated value of the received signal during each period, updating the first phase switching threshold to generate a second phase switching upper bound threshold and a second phase switching lower bound threshold when a plurality of phase offset accumulated values of the received signal during a first predetermined time interval fall into a range from the convergence upper bound to the convergence lower bound, and sampling the received signal continuously for determining if a phase is switched to an opposite operating point according to a phase offset accumulated value of the received signal after the second phase switching upper bound threshold and the second phase switching lower bound threshold are generated. An absolute value of the convergence upper bound and an absolute value of the convergence lower bound are identical. The second phase switching upper bound threshold is derived according to the plurality of phase offset accumulated values. An absolute value of the second phase switching upper bound threshold and an absolute value of the second phase switching lower bound threshold are identical.

In another embodiment of the present invention, the smart phase switching system is disclosed. The smart phase switching system comprises a transmitter and a receiver. The transmitter is configured to generate a transmitted signal. The receiver is configured to receive the transmitted signal for generating a received signal through a link. The receiver comprises a phase detector, a memory, a phase switching circuit, and a processor. The phase detector is configured to detect a phase of the received signal. The memory is configured to save data. The phase switching circuit is configured to optionally switch the phase of the received signal to an opposite operating point. The processor is coupled to the phase detector, the memory, the phase switching circuit and configured to perform a timing recovery process. The processor sets a first phase switching threshold, a convergence upper bound, and a convergence lower bound. The phase detector samples the received signal continuously for acquiring a phase offset accumulated value of the received signal during each period. The phase offset accumulated value of the received signal during the each period is saved to the memory. When a plurality of phase offset accumulated values of the received signal during a first predetermined time interval fall into a range from the convergence upper bound to the convergence lower bound, the processor updates the first phase switching threshold to generate a second phase switching upper bound threshold and a second phase switching lower bound threshold. After the second phase switching upper bound threshold and the second phase switching lower bound threshold are generated, the phase detector samples the received signal continuously for determining if the phase is switched to the opposite operating point according to a phase offset accumulated value of the received signal. An absolute value of the convergence upper bound and an absolute value of the convergence lower bound are identical. The second phase switching upper bound threshold is derived according to the plurality of phase offset accumulated values. An absolute value of the second phase switching upper bound threshold and an absolute value of the second phase switching lower bound threshold are identical.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
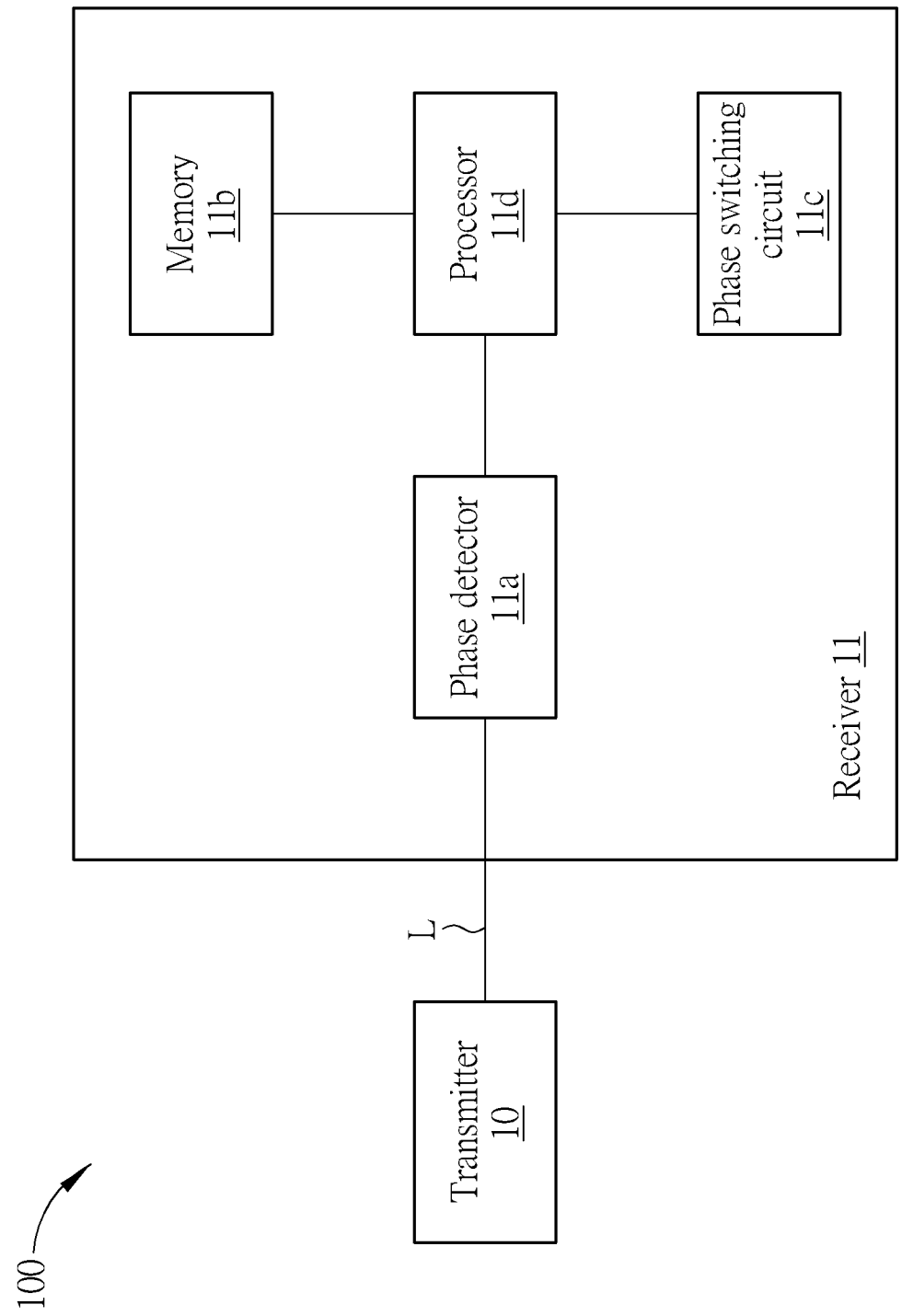
FIG. 1 is a block diagram of a smart phase switching system according to an embodiment of the present invention.

FIG. 1 is a block diagram of a smart phase switching system 100 according to an embodiment of the present invention. The smart phase switching system 100 includes a transmitter 10 and a receiver 11. The transmitter 10 is used for generating a transmitted signal. The receiver 11 is used for receiving the transmitted signal to generate a received signal through a link L. The link L can be a wired link or a wireless link. The receiver 11 can include a phase detector 11a, a memory 11b, a phase switching circuit 11c, and a processor 11d. The phase detector 11a is used for detecting a phase of the received signal. The memory 11b is used for saving data. The phase switching circuit 11c is used for optionally switching the phase of the received signal to an opposite operating point. The processor 11d is coupled to the phase detector 11a, the memory 11b, and the phase switching circuit 11c for performing a timing recovery process. In the smart phase switching system 100, the processor 11d can set a first phase switching threshold, a convergence upper bound, and a convergence lower bound. The phase detector 11a can sample the received signal continuously for acquiring a phase offset accumulated value of the received signal during each period. Further, the phase offset accumulated value of the received signal during the each period can be saved to the memory 11b. Particularly, the smart phase switching system 100 can dynamically adjust phase switching thresholds. For example, when a plurality of phase offset accumulated values of the received signal during a first predetermined time interval fall into a range from the convergence upper bound to the convergence lower bound, the processor 11d can update the first phase switching threshold to generate a second phase switching upper bound threshold and a second phase switching lower bound threshold. Further, after the second phase switching upper bound threshold and the second phase switching lower bound threshold are generated, the phase detector 11a can sample the received signal continuously for determining if the phase is switched to the opposite operating point according to a phase offset accumulated value of the received signal. Here, an absolute value of the convergence upper bound and an absolute value of the convergence lower bound are identical. The second phase switching upper bound threshold can be derived according to the plurality of phase offset accumulated values. An absolute value of the second phase switching upper bound threshold and an absolute value of the second phase switching lower bound threshold are identical. For example, a sign of the second phase switching upper bound threshold and a sign of the second phase switching lower bound threshold are opposite. Since the smart phase switching system 100 is capable of dynamically adjusting the phase switching thresholds, the smart phase switching system 100 can avoid switching phases of the received signal between two opposite operating points frequently. In other words, some unnecessary phase switching operations can be avoided in the smart phase switching system 100. Therefore, system working loads of the timing recovery process can be greatly reduced. Details of a smart phase switching method performed by the phase switching system 100 are illustrated below.

Figure 2:
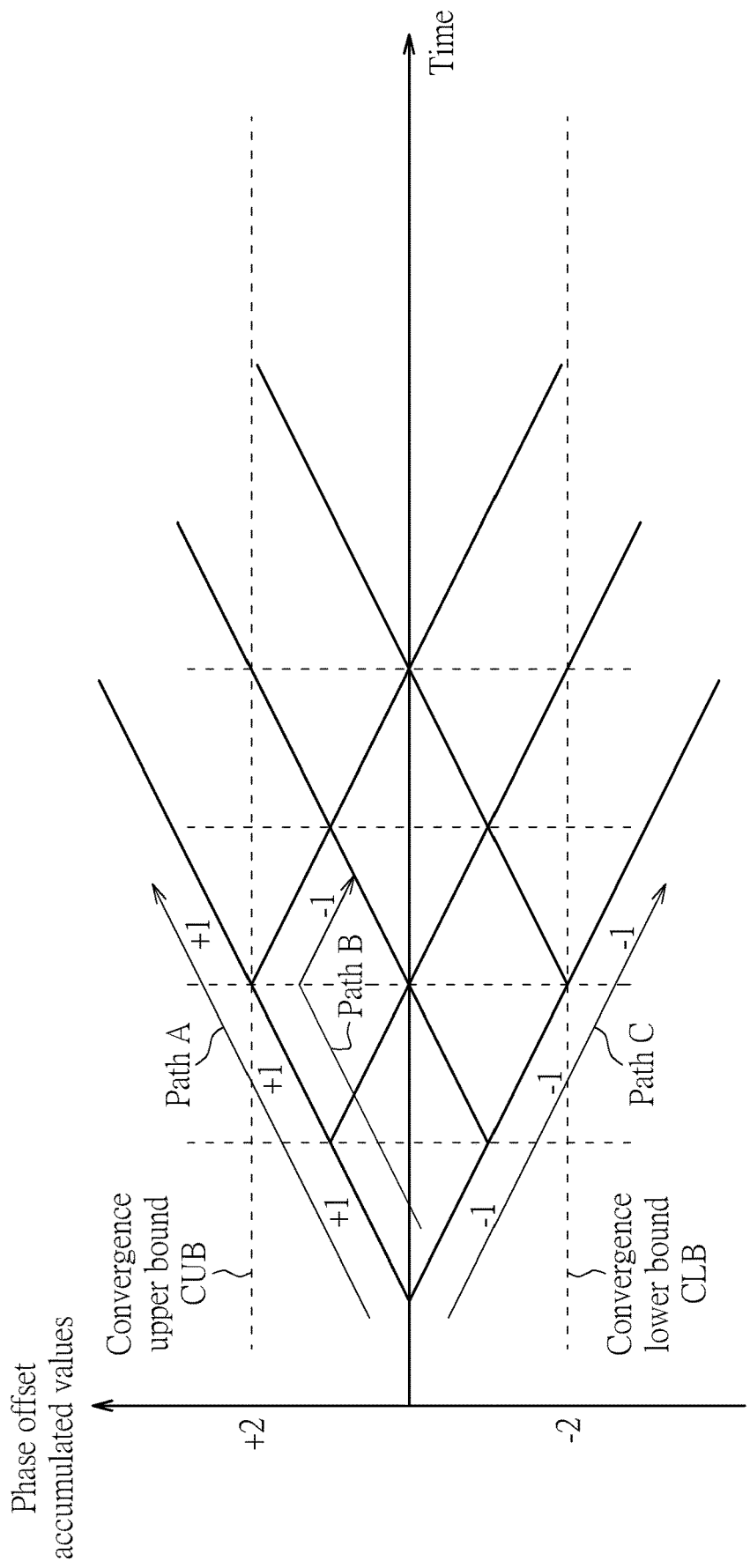
FIG. 2 is an illustration of determining if phase variations of a received signal are converged in the smart phase switching system in FIG. 1.

FIG. 2 is an illustration of determining if phase variations of the received signal are converged in the smart phase switching system 100. In FIG. 2, X-axis is denoted as a time line. Y-axis is denoted as phase offset accumulated values. In FIG. 2, a phase offset accumulated value can be quantized as an integer. Therefore, the Y-axis can be an integer line. However, the phase offset accumulated value can be the integer or a floating-point number. Any reasonable technology modification falls into the scope of the present invention. The convergence upper bound CUB and the convergence lower bound CLB can be two predetermined values with opposite signs. For example, the convergence upper bound CUB can be equal to "+2". The convergence lower bound CLB can be equal to "−2". The phase detector 11a can continuously detect phases of the received signal and generate the phase offset accumulated values over time. For example, when a phase offset accumulated value is increased during a sampling interval, it implies that a phase offset is shifted in a positive direction one time during the sampling interval, denoted as "+1". When the phase offset accumulated value is decreased during a sampling interval, it implies that a phase offset is shifted in a negative direction one time during the sampling interval, denoted as "−1". In other words, after the phase detector 11a continuously samples the received signal for a period of time, the phase offset accumulated values can be expressed as a path. For example, the phase detector 11a detects three phase offsets. When the three phase offsets are shifted in the positive direction, the phase offset accumulated values can be written as "+1", "+1+1=+2", and "+1+1+1=+3", such as a path A. When the three phase offsets are shifted in the negative direction, the phase offset accumulated values can be written as "−1", "−1−1=−2", and "−1−1−1=−3", such as a path C. When two phase offsets are shifted in the positive direction and one phase offset is shifted in the negative direction, the phase offset accumulated values can be written as "+1", "+1+1=+2", and "+1+1−1=+1", such as a path B. Here, when the phase offset accumulated values detected by the phase detector 11a falls into a range from the convergence upper bound CUB and the convergence lower bound CLB, the phase of the received signal is converged. For example, when the phase offset accumulated values correspond to the path B, the phase of the received signal is converged. Conversely, when the phase offset accumulated values detected by the phase detector 11a are outside the range from the convergence upper bound CUB and the convergence lower bound CLB, the phase of the received signal is non-converged (or say, diverged). For example, when the phase offset accumulated values correspond to the path A or the path C, the phase of the received signal is non-converged. However, the convergence upper bound CUB and the convergence lower bound CLB of the phase switching system 100 are not limited by specific values. An increment of the phase offset accumulated value is not limited by "+1". A decrement of the phase offset accumulated value is not limited by "−1". Any reasonable technology modification in FIG. 2 falls into the scope of the present invention.

Figure 3:
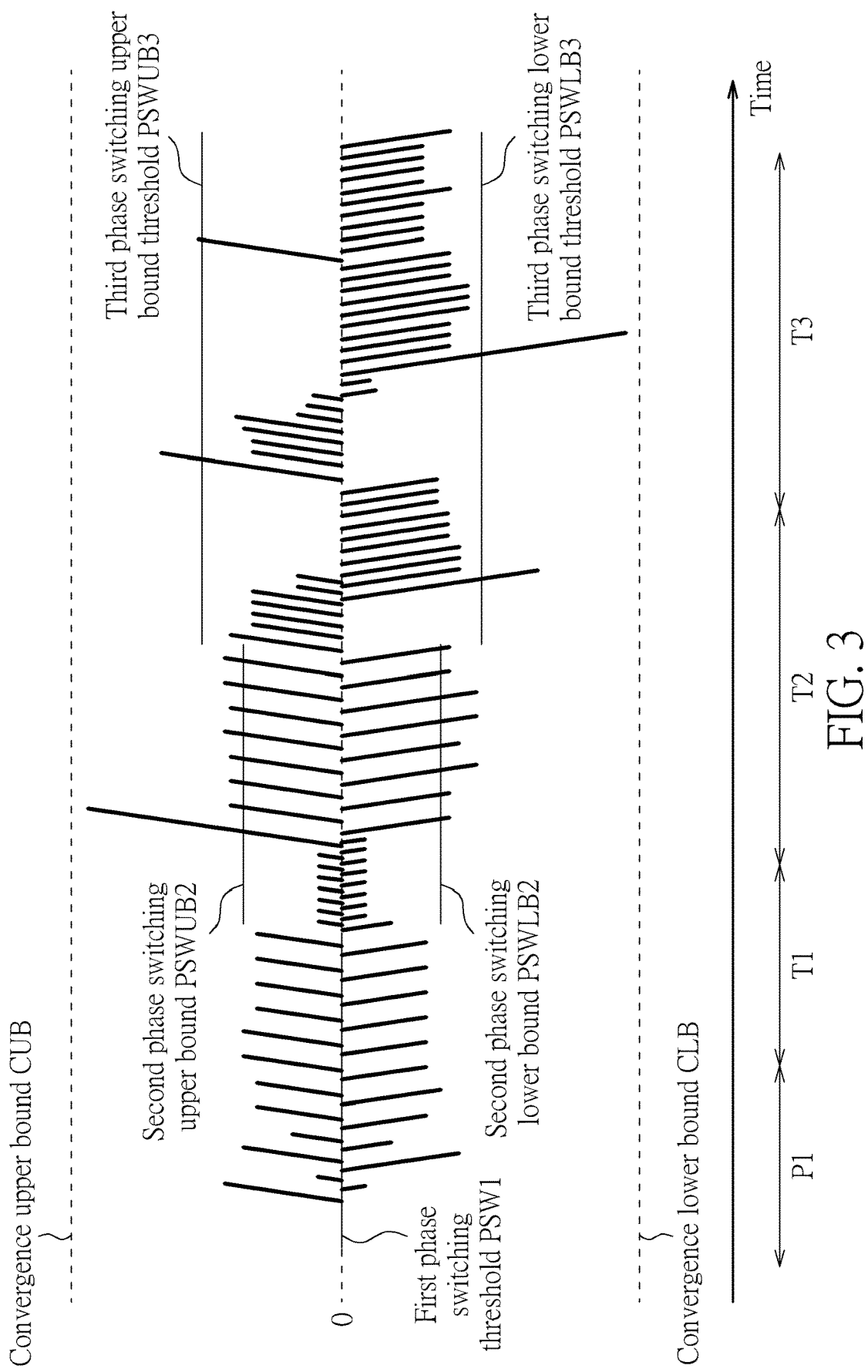
FIG. 3 is an illustration of dynamically adjusting phase switching thresholds of the smart phase switching system in FIG. 1.

FIG. 3 is an illustration of dynamically adjusting phase switching thresholds of the smart phase switching system 100. First, the processor 11d can detect a signal-to-noise ratio (SNR) of the received signal during an observation time interval P1. Then, the processor 11d can determine if the received signal satisfies a target SNR according the SNR of the received signal during the observation time interval P1. Further, the processor 11*d* can set the first phase switching threshold PSW1, the convergence upper bound CUB, and the convergence lower bound CLB. When the received signal is stably converged and satisfies the target SNR during the observation time interval P1, the receiver 11 can enable a smart timing recovery (smart TR) function for performing a smart phase switching process. Then, after the observation time interval P1 elapses, the processor 11*d* can acquire the phase offset accumulated value during each period of a first predetermined time interval T1. The first phase switching threshold PSW1 during the first predetermined time interval T1 can be set equal to zero. In other words, during the first predetermined time interval T1, for floating-point based phase offset accumulated values, when a phase offset accumulated value is greater than zero, the phase switching circuit 11*c* can switch a corresponding phase to an opposite operating point (i.e., pulling down the phase to a lower operating point). When a phase offset accumulated value is smaller than zero, the phase switching circuit 11*c* can switch a corresponding phase to an opposite operating point (i.e., pulling up the phase to a higher operating point). The phase detector 11*a* can record data of the phase offset accumulated value during the each period in the memory 11*b*. Further, during the first predetermined time interval T1, when a phase offset accumulated value is outside the range from the convergence upper bound CUB to the convergence lower bound CLB, it implies that the received signal is unstable (non-converged). The processor 11*d* can delete the phase offset accumulated value and then idles for a period of time. After the period of time elapses, the processor 11*d* can re-enter a process of the first predetermined time interval T1 for generating a plurality of phase offset accumulated values again. Conversely, when a plurality of phase offset accumulated values (i.e., for example, N values) detected by the phase detector 11*a* during the first predetermined time interval T1 fall into the range from the convergence upper bound CUB to the convergence lower bound CLB, it implies that the received data is converged. Then, the processor 11*d* can acquire an average value of a plurality of absolute phase offset accumulated values during the first predetermined time interval T1. Further, the processor 11*d* can multiply the average value by a weighting factor to generate the second phase switching upper bound threshold. Further, the processor 11*d* can generate the second phase switching lower bound threshold according to the second phase switching upper bound threshold. The second phase switching upper bound PSWUB2 can be written as:

$$PSWUB2 = \frac{\alpha \sum_{n=1}^{N} \text{abs}(\theta_n)}{N}$$

N is denoted as the number of periods for sampling the received signal during the first predetermined time interval T1. N is a positive integer (i.e., for example, N=8). α is denoted as the weighting factor. The weighting factor α can be any user-defined value, such as 1.75. Since the first phase switching threshold PSW1 during the first predetermined time interval T1 can be set equal to zero, the second phase switching upper bound PSWUB2 can be greater than the first phase switching threshold PSW1. Further, a sign of the second phase switching upper bound threshold PSWUB2 and a sign of the second phase switching lower bound threshold PSWLB2 are opposite. Therefore, the second phase switching lower bound threshold PSWLB2 can be written as:

$$PSWLB2 = -PSWUB2$$

Further, the second phase switching upper bound threshold PSWUB2 and the second phase switching lower bound threshold PSWLB2 can be two integers or two floating-point numbers.

After the second phase switching upper bound threshold PSWUB2 and the second phase switching lower bound threshold PSWLB2 are determined, the smart phase switching system 100 can enter a next process during a second predetermined time interval T2. Similarly, during the second predetermined time interval T2, when a phase offset accumulated value is greater than the second phase switching upper bound threshold PSWUB2 or is smaller than the second phase switching lower bound threshold PSWLB2, the phase switching circuit 11*c* can switch a corresponding phase to the opposite operating point. When a phase offset accumulated value falls into a range from the second phase switching upper bound threshold PSWUB2 to the second phase switching lower bound threshold PSWLB2, the phase switching circuit 11*c* maintains an operating point of the corresponding phase and continuously accumulates phase offsets of the received signal. In other words, the second phase switching upper bound threshold PSWUB2 and the second phase switching lower bound threshold PSWLB2 can be regarded as two decision boundaries for determining if the corresponding phase is switched to the opposite operating point by the phase switching circuit 11*c*. Further, when a phase offset accumulated value during the second predetermined time interval T2 is outside the range from the convergence upper bound CUB to the convergence lower bound CLB, the processor 11*d* can delete the phase offset accumulated value and save the second phase switching upper bound threshold PSWUB2 and the second phase switching lower bound threshold PSWLB2 to the memory lib. Then, the processor 11*d* can redetect a plurality of phase offset accumulated values of the received signal for determining if the phase variations of the received signal are converged according to the convergence upper bound CUB and the convergence lower bound CLB. Then, the processor 11*d* can determine if the phase is switched to the opposite operating point according to the second phase switching upper bound threshold PSWUB2 and the second phase switching lower bound threshold PSWLB2. Further, after the phase offset accumulated value is deleted, the processor 11*d* can idle for a period of time. After the period of time elapses, the processor 11*d* can collect statistic information for preparing to update the second phase switching upper bound threshold PSWUB2 and the second phase switching lower bound threshold PSWLB2 according to the plurality of phase offset accumulated values of the received signal.

Similarly, when all phase offset accumulated values of the received signal during the second predetermined time interval T2 fall into the range from the convergence upper bound CUB to the convergence lower bound CLB, and some phase offset accumulated values during the second predetermined time interval T2 are outside the range from the second phase switching upper bound threshold PSWUB2 to the second phase switching lower bound threshold PSWLB2, the processor 11*d* can update the second phase switching upper bound threshold PSWUB2 and the second phase switching lower bound threshold PSWLB2 to generate a third phase switching upper bound threshold PSWUB3 and a third phase switching lower bound threshold PSWLB3. Similarly, the third phase switching upper bound threshold PSWUB3 can be written as $$PSWUB3 = \alpha \sum_{n=1}^{N} \text{abs}(\theta_n)/N.$$

Further, a sign of the third phase switching upper bound threshold PSWUB3 and a sign of the third phase switching lower bound threshold PSWLB3 are opposite. Therefore, the third phase switching lower bound threshold PSWLB3 can be written as: −PSWLB3=PSWUB3. After the third phase switching upper bound threshold PSWUB3 and the third phase switching lower bound threshold PSWLB3 are determined, the smart phase switching system 100 can enter a next process during a third predetermined time interval T3, and so on.

By doing so, the phase switching thresholds during the first predetermined time interval T1, the second predetermined time interval T2, and the third predetermined time interval T3 are different. Briefly, statistic information of a plurality of phase offset accumulated values currently detected can be used for updating next phase switching thresholds. In other words, the smart phase switching system 100 can dynamically adjust the phase switching thresholds. Since the phase switching thresholds can be dynamically adjusted, some unnecessary phase switching operations can be avoided in the smart phase switching system 100. Therefore, system working loads of the timing recovery process can be greatly reduced.

Figure 4:
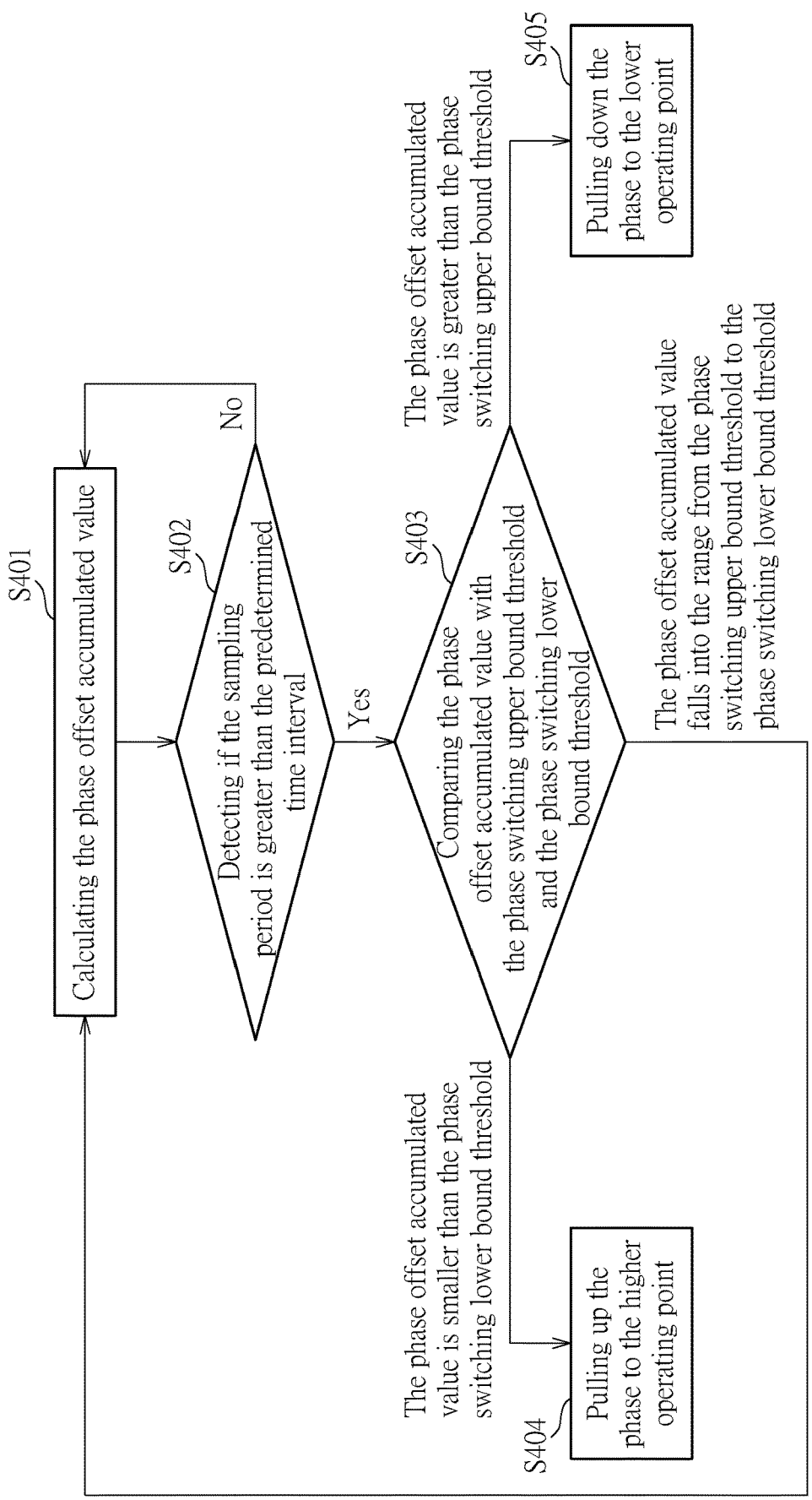
FIG. 4 is an illustration of switching an operating point of a phase according to a phase offset accumulated value of the smart phase switching system in FIG. 1.

FIG. 4 is an illustration of switching the operating point of the phase according to the phase offset accumulated value of the smart phase switching system 100. The phase switching process can include step S401 to step S405. Any reasonable technology modification falls into the scope of the present invention. Step S401 to step S405 are illustrated below.

step S401: calculating the phase offset accumulated value;
step S402: detecting if the sampling period is greater than the predetermined time interval; if the sampling period is greater than the predetermined time interval, executing step S403; else, returning to step S401;
step S403: comparing the phase offset accumulated value with the phase switching upper bound threshold and the phase switching lower bound threshold; if the phase offset accumulated value is smaller than the phase switching lower bound threshold, executing step S404; if the phase offset accumulated value is greater than the phase switching upper bound threshold, executing step S405; if the phase offset accumulated value falls into the range from the phase switching upper bound threshold to the phase switching lower bound threshold, returning to step S401;
step S404: pulling up the phase to the higher operating point.
step S405: pulling down the phase to the lower operating point.

Details of step S401 to step S405 are previously illustrated. Thus, they are omitted here. Briefly, the smart phase switching system 100 can determine if a phase switching operation is required for the timing recovery process according to the phase switching upper bound threshold and the phase switching lower bound threshold. Further, as previously mentioned, some unnecessary phase switching operations can be dynamically adjusted since the smart phase switching system 100 can dynamically adjust the phase switching thresholds. Therefore, system working loads of the timing recovery process can be greatly reduced.

Figure 5:
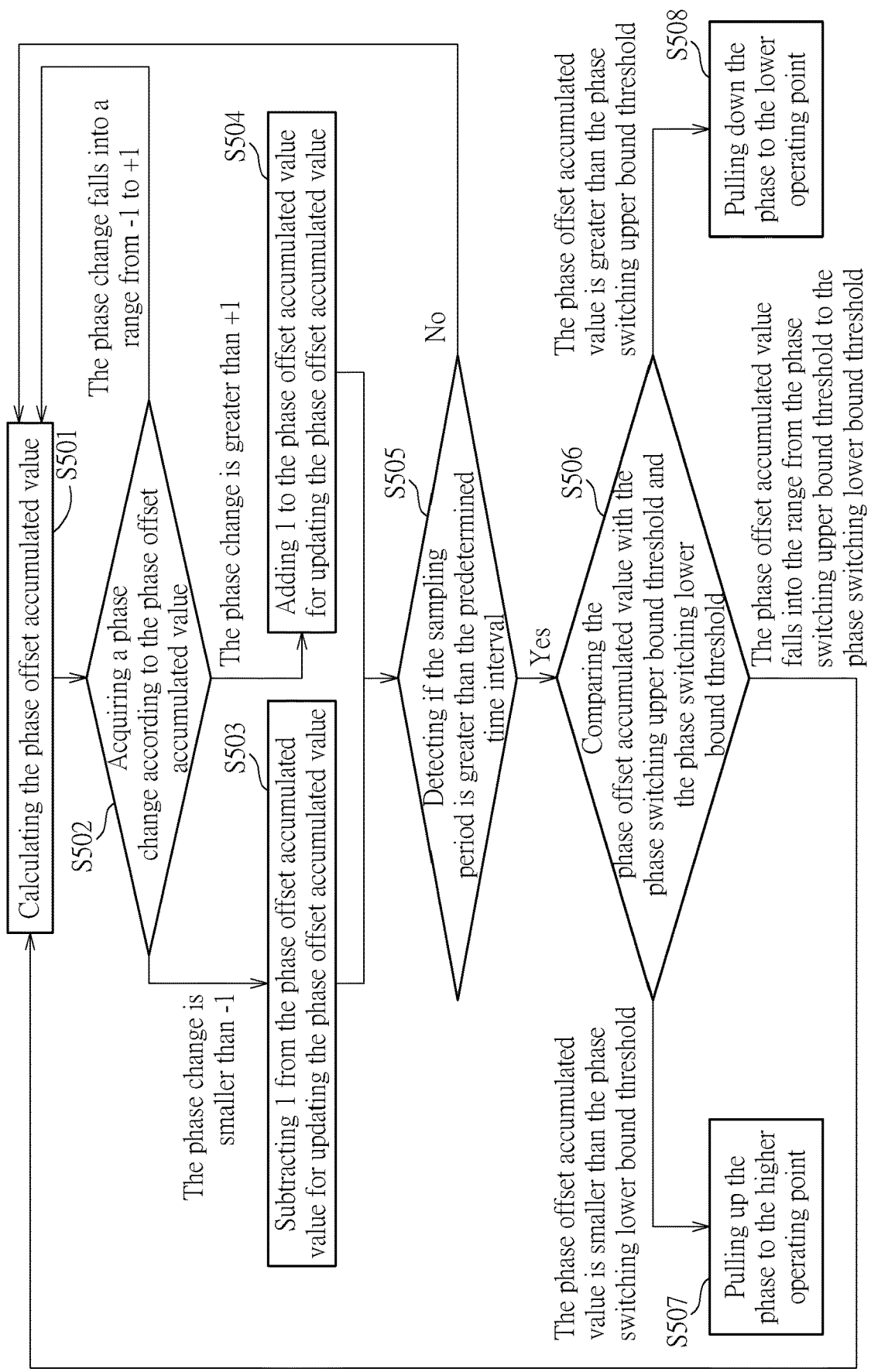
FIG. 5 is an illustration of switching the operating point of the phase by using a quantization process of the smart phase switching system in FIG. 1.

FIG. 5 is an illustration of switching the operating point of the phase by using a quantization process of the smart phase switching system 100. In order to further reduce computational complexity, the smart phase switching system 100 can quantize floating-point numbers to integers. A phase switching quantization process can include step S501 to step S508. Any reasonable technology modification falls into the scope of the present invention. Step S501 to step S508 are illustrated below.

step S501: calculating the phase offset accumulated value;
step S502: acquiring a phase change according to the phase offset accumulated value; if the phase change is smaller than −1, executing step S503; if the phase change is greater than +1, executing step S504; if the phase change falls into a range from −1 to +1, returning to step S501;
step S503: subtracting 1 from the phase offset accumulated value for updating the phase offset accumulated value, and executing step S505;
step S504: adding 1 to the phase offset accumulated value for updating the phase offset accumulated value, and executing step S505;
step S505: detecting if the sampling period is greater than the predetermined time interval; if the sampling period is greater than the predetermined time interval, executing step S506; else, returning to step S501;
Step S506: comparing the phase offset accumulated value with the phase switching upper bound threshold and the phase switching lower bound threshold; if the phase offset accumulated value is smaller than the phase switching lower bound threshold, executing step S507; if the phase offset accumulated value is greater than the phase switching upper bound threshold, executing step S508; if the phase offset accumulated value falls into the range from the phase switching upper bound threshold to the phase switching lower bound threshold, returning to step S501;
step S507: pulling up the phase to the higher operating point.
step S508: pulling down the phase to the lower operating point.

The flow chart in FIG. 5 is similar to the flow chart in FIG. 4. A difference is that the phase change (i.e., an increment phase offset or a decrement phase offset of the phase offset accumulated value), the number of phase offsets shifted in the positive direction, the number of phase offsets shifted in the negative direction, the phase switching lower bound threshold, and the phase switching upper bound threshold can be quantized as integers. In general, when the phase change of the received signal is greater than a quantized value (>+1), the processor 11d adds the quantized value to the phase offset accumulated value (step S504). When the phase offset of the received signal is smaller than the quantized value (<−1), the processor 11d subtracts the quantized value from the phase offset accumulated value. Based on the quantization process, when the phase offset accumulated value is greater than the phase switching upper bound threshold (i.e., for example, a positive integer) or the phase offset accumulated value is smaller than the phase switching lower bound threshold (i.e., for example, a negative integer), the phase switching circuit 11c can be used for switching the phase of the received signal to the opposite operating point. By doing so, since the smart phase switching system 100 can quantize the phase change (the increment phase offset or the decrement phase offset of the phase offset accumulated value), the number of phase offsets shifted in the positive direction, the number of phase offsets shifted in the negative direction, the phase switching lower bound threshold, and the phase switching upper bound threshold as integers, system working loads (i.e., such as comparator circuits and phase offset accumulated circuits) can be further reduced. However, since a quantization error may be introduced by quantizing floating-point numbers to integers, the quantization process in FIG. 5 may reduce sensitivity of phase variations.

Figure 6:
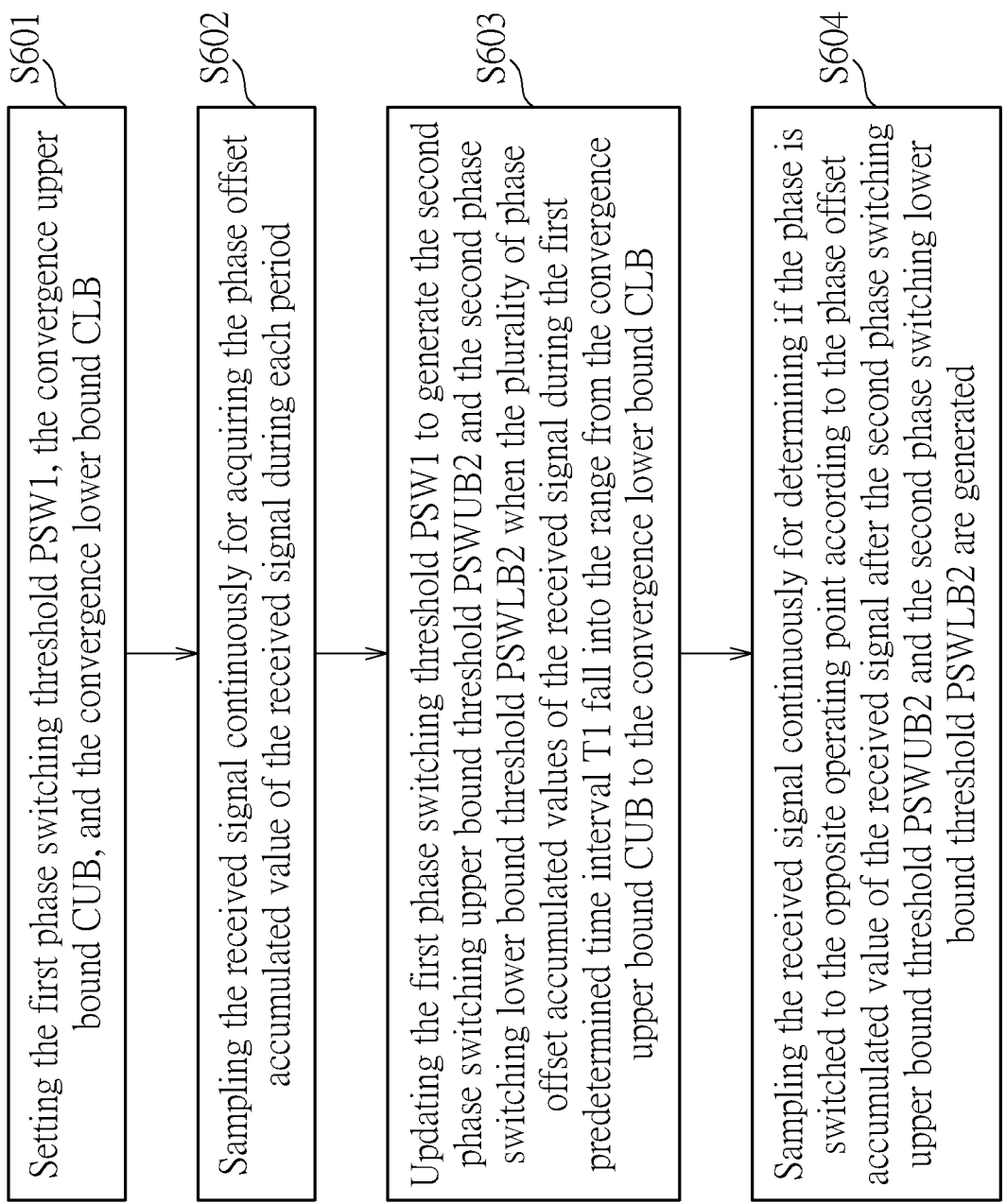
FIG. 6 is a flow chart of a smart phase switching method performed by the smart phase switching system in FIG. 1.

FIG. 6 is a flow chart of a smart phase switching method performed by the smart phase switching system 100. The smart phase switching method can include step S601 to step S604. Any reasonable technology modification falls into the scope of the present invention. Step S601 to step S604 are illustrated below.

step S601: setting the first phase switching threshold PSW1, the convergence upper bound CUB, and the convergence lower bound CLB;

step S602: sampling the received signal continuously for acquiring the phase offset accumulated value of the received signal during each period;

step S603: updating the first phase switching threshold PSW1 to generate the second phase switching upper bound threshold PSWUB2 and the second phase switching lower bound threshold PSWLB2 when the plurality of phase offset accumulated values of the received signal during the first predetermined time interval T1 fall into the range from the convergence upper bound CUB to the convergence lower bound CLB;

step S604: sampling the received signal continuously for determining if the phase is switched to the opposite operating point according to the phase offset accumulated value of the received signal after the second phase switching upper bound threshold PSWUB2 and the second phase switching lower bound threshold PSWLB2 are generated.

Details of step S601 to step S604 are previously illustrated. Thus, they are omitted here. In the smart phase switching system 100, the phase switching thresholds are not constants. The phase switching thresholds can be dynamically adjusted. Since the phase switching thresholds can be dynamically adjusted, some unnecessary phase switching operations can be avoided in the smart phase switching system 100. Therefore, system working loads of the timing recovery process can be greatly reduced.

To sum up, the present invention discloses a smart phase switching system and a smart phase switching method. The smart phase switching system and the smart phase switching method can be applied to a timing recovery process. The smart phase switching system can detect phase variations for acquiring phase offset accumulated values of a received signal during each time interval. Further, the smart phase switching system can adjust phase switching thresholds according to statistic information of phase offset accumulated values. Since the statistic information of phase offset accumulated values is relevant to the received signal, the smart phase switching system can be used for optimizing performance of switching phases under a wired or a wireless channel. Further, since the smart phase switching system can dynamically adjust the phase switching thresholds, some unnecessary phase switching operations can be avoided. Therefore, system working loads of the timing recovery process can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart phase switching method comprising:
    setting a first phase switching threshold, a convergence upper bound, and a convergence lower bound;
    sampling a received signal continuously for acquiring a phase offset accumulated value of the received signal during each period;
    updating the first phase switching threshold to generate a second phase switching upper bound threshold and a second phase switching lower bound threshold when a plurality of phase offset accumulated values of the received signal during a first predetermined time interval fall into a range from the convergence upper bound to the convergence lower bound; and
    sampling the received signal continuously for determining if a phase is switched to an opposite operating point according to a phase offset accumulated value of the received signal after the second phase switching upper bound threshold and the second phase switching lower bound threshold are generated;
    wherein an absolute value of the convergence upper bound and an absolute value of the convergence lower bound are identical, the second phase switching upper bound threshold is derived according to the plurality of phase offset accumulated values, and an absolute value of the second phase switching upper bound threshold and an absolute value of the second phase switching lower bound threshold are identical.

2. The method of claim 1, further comprising:
    detecting a signal-to-noise ratio (SNR) of the received signal during an observation time interval; and
    determining if the received signal satisfies a target SNR according the SNR of the received signal during the observation time interval.

3. The method of claim 1, wherein updating the first phase switching threshold to generate the second phase switching upper bound threshold and the second phase switching lower bound threshold comprises:
    acquiring an average value of a plurality of absolute phase offset accumulated values;
    multiplying the average value by a weighting factor to generate the second phase switching upper bound threshold; and
    generating the second phase switching lower bound threshold according to the second phase switching upper bound threshold;
    wherein the first phase switching threshold is zero.

4. The method of claim 3, wherein the weighting factor is greater than one, and a sign of the second phase switching upper bound threshold and a sign of the second phase switching lower bound threshold are opposite.

5. The method of claim 1, wherein sampling the received signal continuously for determining if the phase is switched to the opposite operating point according to the phase offset accumulated value of the received signal after the second phase switching upper bound threshold and the second phase switching lower bound threshold are generated comprises:
    when the phase offset accumulated value is greater than the second phase switching upper bound threshold or is smaller than the second phase switching lower bound threshold, switching the phase to the opposite operating point; and
    when the phase offset accumulated value falls into a range from the second phase switching upper bound threshold to the second phase switching lower bound threshold, maintaining an operating point of the phase and continuously accumulating phase offsets of the received signal.

6. The method of claim 1, further comprising:
deleting a phase offset accumulated value and saving the second phase switching upper bound threshold and the second phase switching lower bound threshold when the phase offset accumulated value of a plurality of phase offset accumulated values of the received signal during a second predetermined time interval is outside the range from the convergence upper bound to the convergence lower bound;
redetecting a plurality of phase offset accumulated values of the received signal for determining if a phase of the received signal is converged; and
determining if the phase is switched to the opposite operating point according to the second phase switching upper bound threshold and the second phase switching lower bound threshold.

7. The method of claim 6, further comprising:
waiting a period of time after the phase offset accumulated value is deleted; and
collecting statistic information for preparing to update the second phase switching upper bound threshold and the second phase switching lower bound threshold according to the plurality of phase offset accumulated values of the received signal.

8. The method of claim 1, further comprising:
updating the second phase switching upper bound threshold and the second phase switching lower bound threshold to generate a third phase switching upper bound threshold and a third phase switching lower bound threshold when all phase offset accumulated values of the received signal during a second predetermined time interval fall into the range from the convergence upper bound to the convergence lower bound;
wherein the second predetermined time interval follows the first predetermined time interval.

9. The method of claim 1, wherein the first phase switching threshold is zero, the convergence upper bound and the convergence lower bound are two integers, and the second phase switching upper bound threshold and the second phase switching lower bound threshold are two integers or two floating-point numbers.

10. The method of claim 9, further comprising:
quantizing the phase offset accumulated value of the received signal during the each period to an integer;
when a phase offset of the received signal is greater than a quantized value, adding the quantized value to the phase offset accumulated value; and
when the phase offset of the received signal is smaller than the quantized value, subtracting the quantized value from the phase offset accumulated value.

11. A smart phase switching system comprising:
a transmitter configured to generate a transmitted signal; and
a receiver configured to receive the transmitted signal for generating
a received signal through a link, the receiver comprising:
a phase detector configured to detect a phase of the received signal;
a memory configured to save data;
a phase switching circuit configured to optionally switch the phase of the received signal to an opposite operating point; and
a processor coupled to the phase detector, the memory, the phase switching circuit and configured to perform a timing recovery process;
wherein the processor sets a first phase switching threshold, a convergence upper bound, and a convergence lower bound, the phase detector samples the received signal continuously for acquiring a phase offset accumulated value of the received signal during each period, the phase offset accumulated value of the received signal during the each period is saved to the memory, when a plurality of phase offset accumulated values of the received signal during a first predetermined time interval fall into a range from the convergence upper bound to the convergence lower bound, the processor updates the first phase switching threshold to generate a second phase switching upper bound threshold and a second phase switching lower bound threshold, after the second phase switching upper bound threshold and the second phase switching lower bound threshold are generated, the phase detector samples the received signal continuously for determining if the phase is switched to the opposite operating point according to a phase offset accumulated value of the received signal, an absolute value of the convergence upper bound and an absolute value of the convergence lower bound are identical, the second phase switching upper bound threshold is derived according to the plurality of phase offset accumulated values, and an absolute value of the second phase switching upper bound threshold and an absolute value of the second phase switching lower bound threshold are identical.

12. The system of claim 11, wherein the processor detects a signal-to-noise ratio (SNR) of the received signal during an observation time interval, and determines if the received signal satisfies a target SNR according the SNR of the received signal during the observation time interval.

13. The system of claim 11, wherein the first phase switching threshold is zero, the processor acquires an average value of a plurality of absolute phase offset accumulated values, multiplies the average value by a weighting factor to generate the second phase switching upper bound threshold, and generates the second phase switching lower bound threshold according to the second phase switching upper bound threshold.

14. The system of claim 13, wherein the weighting factor is greater than one, and a sign of the second phase switching upper bound threshold and a sign of the second phase switching lower bound threshold are opposite.

15. The system of claim 11, wherein when the phase offset accumulated value is greater than the second phase switching upper bound threshold or is smaller than the second phase switching lower bound threshold, the phase switching circuit switches the phase to the opposite operating point, and when the phase offset accumulated value falls into a range from the second phase switching upper bound threshold to the second phase switching lower bound threshold, the phase switching circuit maintains an operating point of the phase and continuously accumulates phase offsets of the received signal.

16. The system of claim 11, wherein when a phase offset accumulated value of a plurality of phase offset accumulated values of the received signal during a second predetermined time interval is outside the range from the convergence upper bound to the convergence lower bound, the processor deletes the phase offset accumulated value and saves the second phase switching upper bound threshold and the second phase switching lower bound threshold to the memory, the processor redetects a plurality of phase offset accumulated values of the received signal for determining if a phase of the received signal is converged, and determines if the phase is switched to the opposite operating point according to the second phase switching upper bound threshold and the second phase switching lower bound threshold.

17. The system of claim 16, wherein after the phase offset accumulated value is deleted, the processor idles for a period of time, and after the period of time elapses, the processor collects statistic information for preparing to update the second phase switching upper bound threshold and the second phase switching lower bound threshold according to the plurality of phase offset accumulated values of the received signal.

18. The system of claim 11, wherein when all phase offset accumulated values of the received signal during a second predetermined time interval fall into the range from the convergence upper bound to the convergence lower bound, the processor updates the second phase switching upper bound threshold and the second phase switching lower bound threshold to generate a third phase switching upper bound threshold and a third phase switching lower bound threshold.

19. The system of claim 11, wherein the first phase switching threshold is zero, the convergence upper bound and the convergence lower bound are two integers, and the second phase switching upper bound threshold and the second phase switching lower bound threshold are two integers or two floating-point numbers.

20. The system of claim 19, wherein the processor quantizes the phase offset accumulated value of the received signal during the each period to an integer, when a phase offset of the received signal is greater than a quantized value, the processor adds the quantized value to the phase offset accumulated value, and when the phase offset of the received signal is smaller than the quantized value, the processor subtracts the quantized value from the phase offset accumulated value.

* * * * *